US 6,688,007 B2

(12) United States Patent
Ferron

(10) Patent No.: US 6,688,007 B2
(45) Date of Patent: Feb. 10, 2004

(54) LANE ALIGNMENT DRIVING AID

(76) Inventor: Steven Ferron, 2211 Pullman La., Redondo Beach, CA (US) 90278

( * ) Notice: Subject to any disclaimer, the term of this patent is extended or adjusted under 35 U.S.C. 154(b) by 0 days.

(21) Appl. No.: 10/000,377

(22) Filed: Oct. 31, 2001

(65) Prior Publication Data

US 2003/0079355 A1 May 1, 2003

(51) Int. Cl.$^7$ ................................................ G01B 11/26
(52) U.S. Cl. ......................... 33/264; 33/286; 116/28 R
(58) Field of Search ......................... 33/264, 286, 288; 116/28 R, 35 R, 42

(56) References Cited

U.S. PATENT DOCUMENTS

| | | | | |
|---|---|---|---|---|
| 1,429,116 A | * | 9/1922 | Rommer | 116/28 R |
| 1,610,477 A | * | 12/1926 | Sanford | 116/28 R |
| 1,871,532 A | * | 8/1932 | Kenna | 33/264 |
| 2,046,581 A | * | 7/1936 | Reeves | 33/264 |
| 2,584,777 A | * | 2/1952 | Adofson | 33/264 |
| 2,870,735 A | * | 1/1959 | Hunt | 116/28 R |
| 3,199,487 A | * | 8/1965 | Heinkel | 116/28 R |
| 3,670,438 A | * | 6/1972 | Carroll et al. | 116/28 R |
| 3,834,036 A | * | 9/1974 | Scarritt, Sr. | 33/264 |
| 4,016,653 A | * | 4/1977 | Bartlett | 116/28 R |
| 4,079,519 A | * | 3/1978 | Carmouche | 33/264 |

* cited by examiner

Primary Examiner—G. Bradley Bennett
(74) Attorney, Agent, or Firm—David A. Belasco; Belasco Jacobs & Townsley, LLP

(57) ABSTRACT

A lane alignment driving aid includes first and second lane alignment markers. The markers have linear interior edges and are symmetrically spaced about a centerline. The markers are attached to a vehicle windshield and aligned to bracket the first and second edges of a displayed lane marker adhered to a road surface. When the alignment markers are attached to a vehicle windshield so that a driver seated in a vehicle can observe the displayed lane marker adhered to the road surface between the symmetrically spaced edges of the first and second lane alignment markers while driving, the driver will be more easily able to guide the vehicle in parallel proximity to a roadway lane edge. The means for attaching the markers to the vehicle windshield includes a sheet of flexible, transparent material. The material has an inner surface, an outer surface and has the first and second lane alignment markers affixed to either the inner or outer surface. The linear interior edges of the lane alignment markers are visible to the driver in either ambient lighting or artificial lighting provided by headlights of the driver's vehicle. The sheet of flexible, transparent material is adhered to the vehicle windshield using rubber cement, moisture or static electricity. The lane alignment driving aid includes graphic advertising located upon at least a portion of the sheet of flexible, transparent material.

4 Claims, 1 Drawing Sheet

LANE ALIGNMENT DRIVING AID

FIELD OF INVENTION

The invention pertains to driving aids. More particularly, the invention relates to devices for maintaining the alignment of a vehicle with lane markers displayed on the road surface.

BACKGROUND OF THE INVENTION

Various types of inventions have been developed for assisting a driver to maintain alignment of his vehicle with displayed lane markers; incorporating a number of different technologies. U.S. Pat. Nos. 4,928,393 and 4,823,471 issued to Van Schaack disclose steering guides affixed to a vehicle windshield with suction cups or attached to a vehicle dashboard. Each incorporates a movable pointer for alignment with a roadway lane edge marker stripe.

U.S. Pat. No. 3,772,795 issued to Calvet, is directed to a range, trailing distance, and safe passing indicator for motor vehicle operators. The optical driving aid comprises a rectangular transparent plastic strip or patch attached to the inside of a vehicle windshield by utilizing a suitable adhesive. The strip is positioned to the left of the normal line of sight so that the operator can view the leading vehicle superimposed on the strip so that by determining as to which graduation mark line the bottom of the image falls will indicate the distance in feet between the vehicles. An alignment member in the form of a vertical rod mounted on the hood in alignment with the plastic strip can be used for a more accurate determination of distance.

U.S. Pat. No. 5,052,113, issued to Aquino is directed to a dash mounted vehicle lane and parking guide. The instrument panel of a vehicle is provided with a guide including a mat that is adhesively attached to the horizontal upper surface of the instrument panel. The guide has on the mat a number of lines to aid the driver in properly positioning the vehicle on the roadway. During daylight operation, ambient light allows the driver to clearly see the guidelines. During night use, illumination can be provided or back surface illumination used.

U.S. Pat. No. 6,142,013 issued to Gray is directed to a navigational aid for agricultural equipment in the form of a rail with indicia that is mounted on the inner surface of a vehicle window using pressure-sensitive adhesive. The navigational aid is a rail of plastic material having slots adapted to slidably hold a marker. The marker is positioned on the rail in the line of sight between the driver of the vehicle and the reference line so that he is aided in driving the vehicle to maintain the desired distance from the reference line, typically a plowed furrow.

U.S. Pat. No. 3,199,487 issued to Heinkel is directed to a vehicle guide to indicate to the driver when the vehicle is positioned in parallel to one side of the roadway. The vehicle can be fitted with two forms of vehicle guide that are elongated and are secured to the upper windshield frame molding and the dashboard. In addition to being positioned for aid in spacing the vehicle from curbing, the guide could be positioned for aiding in spacing the vehicle from the centerline or from left curbing.

While other variations exist, the above-described designs for lane alignment driving aids are typical of those encountered in the prior art. It is an objective of the present invention to provide a means to assist a driver to maintain alignment of his vehicle with displayed lane markers. It is a further objective to provide assistance in an inexpensive device that may be removably attached to the vehicle's windshield with out tools or producing permanent damage to the vehicle or windshield. It is a still further objective of the invention to provide the above described capabilities in a device that obscures the road surface as seen through the windshield as little as possible while providing an alignment aid that is easily visible day or night. It is yet a further objective to provide a lane alignment guide that is easily adjustable, even while driving.

While some of the objectives of the present invention are disclosed in the prior art, none of the inventions found include all of the requirements identified.

SUMMARY OF THE INVENTION

The present invention addresses many of the deficiencies of lane alignment driving aids and satisfies all of the objectives described above.

A lane alignment driving aid may be fabricated from the following components. First and second lane alignment markers are provided. The markers have linear interior edges and are symmetrically spaced about a centerline. Means are provided for attaching the markers to a vehicle windshield such that the markers are aligned to bracket first and second edges of a displayed lane marker adhered to a road surface. When the alignment markers are attached to a vehicle windshield so that a driver seated in a vehicle can observe the displayed lane marker adhered to the road surface between the symmetrically spaced edges of the first and second lane alignment markers while driving, the driver will be more easily able to guide the vehicle in parallel proximity to a roadway lane edge.

In a variant of the invention, the means for attaching the markers to a vehicle windshield such that the markers are aligned to bracket first and second edges of a displayed lane marker adhered to the road surface includes a sheet of flexible, transparent material. The material has an inner surface, an outer surface and has the first and second lane alignment markers affixed to either the inner or outer surface. The linear interior edges of the lane alignment markers are visible to the driver in either ambient lighting or artificial lighting provided by headlights of the driver's vehicle. Means are provided for removably adhering the sheet to the vehicle windshield.

In a further variant, the means for removably adhering the sheet of flexible, transparent material to the vehicle windshield is selected from the group including: rubber cement, moisture and static electricity.

In a final variant, the lane alignment driving aid includes graphic advertising disposed upon at least a portion of the sheet of flexible, transparent material.

DETAILED DESCRIPTION OF THE PREFERRED EMBODIMENT

Figure 1:
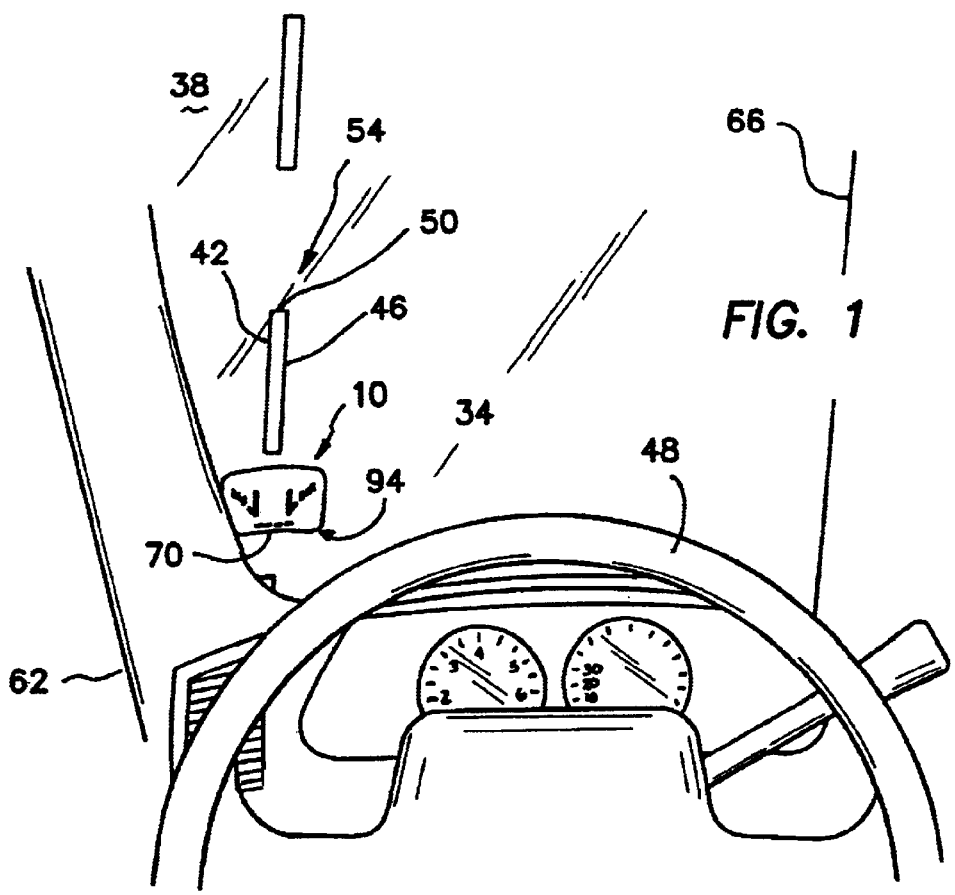
FIG. 1 is a perspective view of the preferred embodiment of the invention as attached to a windshield of an automobile as viewed from the driver's seat.
Figure 2:
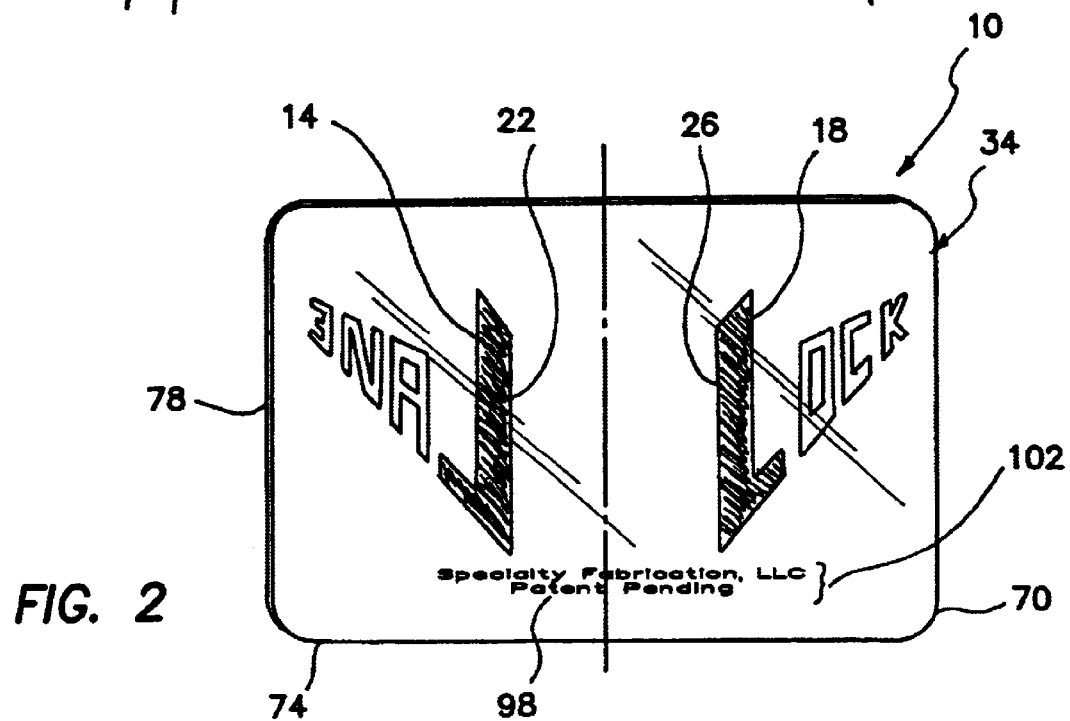
FIG. 2 is an enlarged perspective view of the FIG. 1 embodiment illustrating the addition of graphic advertising to the invention.

FIGS. 1–2 illustrate a lane alignment driving aid 10 that may be fabricated from the following components. First 14 and second 18 lane alignment markers are provided. The markers 14, 18 have linear interior edges 22, 26 and are spaced apart. Means 34 are provided for attaching the markers 14, 18 to a vehicle windshield 38 to one side of the driving wheel 48 such that the interior edges 22, 26 of the markers 14, 18 are aligned to bracket first 42 and second 46 edges of a single, observed lane marker 50 adhered to a road surface 54. When the alignment markers 14, 18 are attached to a vehicle windshield 38 in this way, a driver seated in a vehicle 62 can observe the single lane marker 50 adhered to the road surface 54 between the spaced apart edges 22, 26 of the first 14 and second 18 lane alignment markers while driving. In this way the driver will be more easily able to guide the vehicle 62 in parallel proximity to a roadway lane edge 66.

In a variant of the invention, the means 34 for attaching the markers 14, 18 to a vehicle windshield 38 such that the markers 14, 18 are aligned to bracket first 42 and second 46 edges of a displayed lane marker 50 adhered to the road surface 54 includes a sheet of flexible, transparent material 70. The material 70 has an inner surface 74, an outer surface 78 and has the first 14 and second 18 lane alignment markers affixed to either the inner 74 or outer 78 surface. The linear interior edges 22, 26 of the lane alignment markers 14, 18 are visible to the driver in either ambient lighting or artificial lighting provided by the headlights of the driver's vehicle 62. Means 94 are provided for removably adhering the sheet 70 to the vehicle windshield 38.

In a further variant, the means 94 for removably adhering the sheet of flexible, transparent material 70 to the vehicle windshield 38 is selected from the group including: rubber cement, moisture and static electricity.

In a final variant, the lane alignment driving aid 10 includes graphic advertising 98 disposed upon at least a portion 102 of the sheet of flexible, transparent material 70.

The lane alignment driving aid 10 has been described with reference to particular embodiments. Other modifications and enhancements can be made without departing from the spirit and scope of the claims that follow.

What is claimed is:

1. A lane alignment driving aid, comprising:

first and second lane alignment markers, each of said lane alignment markers having a linear interior edge; said lane alignment markers being spaced apart so as to bracket first and second edges of a single lane marker adhered to a road surface at the plane of the windshield as the lane marker is viewed from the driving position; and means for attaching said lane alignment markers to the vehicle windshield to one side of the steering wheel;

whereby, when said lane alignment markers are attached to the vehicle windshield to one side of the steering wheel, a driver seated in the driving position can observe the single lane marker between the linear interior edges of said lane alignment markers while driving, so that the driver will be more easily able to guide the vehicle in parallel proximity to a roadway lane edge.

2. A lane alignment driving aid as described in claim 1, wherein the means for attaching said lane alignment markers to the vehicle windshield further comprises:

a sheet of flexible, transparent material, said material having an inner surface and an outer surface; said lane alignment markers being affixed to either of said inner and outer surfaces; and means for removably adhering said sheet to the vehicle windshield.

3. A lane alignment driving aid as described in claim 2, wherein said means for removably adhering said sheet is selected from the group comprising rubber cement, moisture and static electricity.

4. A lane alignment driving aid as described in claim 2, further comprising graphic advertising disposed upon at least a portion of said sheet of flexible, transparent material.

\* \* \* \* \*